(12) United States Patent
Teale et al.

(10) Patent No.: US 10,472,911 B2
(45) Date of Patent: Nov. 12, 2019

(54) GRIPPING APPARATUS AND ASSOCIATED METHODS OF MANUFACTURING

(71) Applicant: WEATHERFORD TECHNOLOGY HOLDINGS, LLC, Houston, TX (US)

(72) Inventors: David W. Teale, Spring, TX (US); Jeffery Scott Pray, Shenandoah, TX (US)

(73) Assignee: Weatherford Technology Holdings, LLC., Houston, TX (US)

(*) Notice: Subject to any disclaimer, the term of this patent is extended or adjusted under 35 U.S.C. 154(b) by 263 days.

(21) Appl. No.: 15/464,131

(22) Filed: Mar. 20, 2017

(65) Prior Publication Data
US 2018/0266200 A1    Sep. 20, 2018

(51) Int. Cl.
E21B 23/01    (2006.01)
E21B 33/126    (2006.01)
B33Y 80/00    (2015.01)

(52) U.S. Cl.
CPC .......... *E21B 23/01* (2013.01); *E21B 33/1265* (2013.01); *B33Y 80/00* (2014.12)

(58) Field of Classification Search
CPC ...... E21B 23/01; E21B 33/1265; B33Y 80/00
See application file for complete search history.

(56) References Cited

U.S. PATENT DOCUMENTS

| 6,637,750 | B2 | 10/2003 | Quoiani |
| 7,134,506 | B2 | 11/2006 | Moyes |
| 7,165,622 | B2 | 1/2007 | Hirth et al. |
| 7,510,019 | B2 | 3/2009 | Li et al. |
| RE45,518 | E | 5/2015 | Martin et al. |

(Continued)

FOREIGN PATENT DOCUMENTS

| CN | 201193495 Y | 2/2009 |
| EP | 2546557 A1 | 1/2013 |

(Continued)

OTHER PUBLICATIONS

International Search Report with Written Opinion dated Jun. 11, 2018 for PCT Patent Application No. PCT/US18/020073, 17 pages.

(Continued)

*Primary Examiner* — Michael R Wills, III
(74) *Attorney, Agent, or Firm* — Smith IP Services, P.C.

(57) ABSTRACT

A method of manufacturing a gripping element can include depositing a gripping element material, and thereby gradually building up the gripping element and forming a gripping surface thereon, the gripping surface being configured to grippingly engage a well surface. A gripping system can include at least one extendable gripping element configured to grip a well surface, and the gripping element including a gripping element material enclosing one or more voids in the gripping element. Another gripping system can include at least one extendable gripping element having a gripping surface configured to grip a well surface, and the gripping element including at least two gripping element materials deposited to form the gripping element. Properties or characteristics may gradually change or vary from one gripping element material to another gripping element material in the gripping element. The gripping element materials may each include the same basic matrix material.

24 Claims, 8 Drawing Sheets

(56) References Cited

U.S. PATENT DOCUMENTS

| | | |
|---|---|---|
| 9,097,095 B2 | 8/2015 | Vanlue |
| 9,636,872 B2 | 5/2017 | Batchelder |
| 9,821,339 B2 | 11/2017 | Paschkewitz et al. |
| 9,895,841 B2 | 2/2018 | Page |
| 2002/0189820 A1 | 12/2002 | Slup et al. |
| 2006/0207771 A1 | 9/2006 | Rios, III et al. |
| 2011/0148043 A1 | 6/2011 | Gaudette et al. |
| 2012/0073343 A1 | 3/2012 | Prehn |
| 2013/0004664 A1 | 1/2013 | Agrawal et al. |
| 2013/0022832 A1 | 1/2013 | Guset et al. |
| 2014/0255198 A1 | 9/2014 | El-Wardany et al. |
| 2015/0101797 A1 | 4/2015 | Davies et al. |
| 2015/0217367 A1 | 8/2015 | Dickey et al. |
| 2015/0218903 A1 | 8/2015 | Sellers, Jr. et al. |
| 2015/0331402 A1 | 11/2015 | Lin et al. |
| 2015/0345246 A1* | 12/2015 | Raynal .................. E21B 33/043 166/338 |
| 2016/0096318 A1 | 4/2016 | Bickel et al. |
| 2016/0138362 A1* | 5/2016 | Dockweiler .......... E21B 33/129 166/138 |
| 2016/0258242 A1 | 9/2016 | Hayter et al. |
| 2017/0072465 A1 | 3/2017 | Welch et al. |
| 2017/0282457 A1 | 10/2017 | Burns et al. |
| 2017/0314102 A1* | 11/2017 | Roy ........................ E21B 23/00 |
| 2017/0314103 A1* | 11/2017 | Roy ........................ C22C 29/02 |
| 2017/0342797 A1 | 11/2017 | Murphree et al. |
| 2018/0094494 A1 | 4/2018 | Basler |

FOREIGN PATENT DOCUMENTS

| | | |
|---|---|---|
| WO | 2003002847 A1 | 1/2003 |
| WO | 2009098467 A1 | 8/2009 |
| WO | 2013013975 A1 | 1/2013 |
| WO | 2017039619 A1 | 3/2017 |

OTHER PUBLICATIONS

International Search Report with Written Opinion dated Feb. 26, 2018 for PCT Patent Application No. PCT/US18/019629, 17 pages.

Freudenberg; "FlexLok MTM Seals", company web article, dated 2014, 2 pages.

Office Action dated Mar. 7, 2017 for U.S. Appl. No. 15/463,837, 33 pages.

* cited by examiner

GRIPPING APPARATUS AND ASSOCIATED METHODS OF MANUFACTURING

BACKGROUND

This disclosure relates generally to equipment utilized and services performed in conjunction with subterranean operations and, in an example described below, more particularly provides a gripping apparatus and a method of manufacturing same.

A gripping apparatus may be required to perform in a variety of different environments and configurations. For example, a same slip design may be used in different casing sizes, or a gripping apparatus may in some situations not be centered in a casing or wellbore it is intended to grip. Vibration or high dynamic loads, etc., may be applied to the gripping apparatus.

It will, thus, be appreciated that improvements are continually needed in the arts of gripping apparatus design and manufacture. Such improvements would be useful for implementation in downhole or other harsh environments.

DETAILED DESCRIPTION

Figure 1:
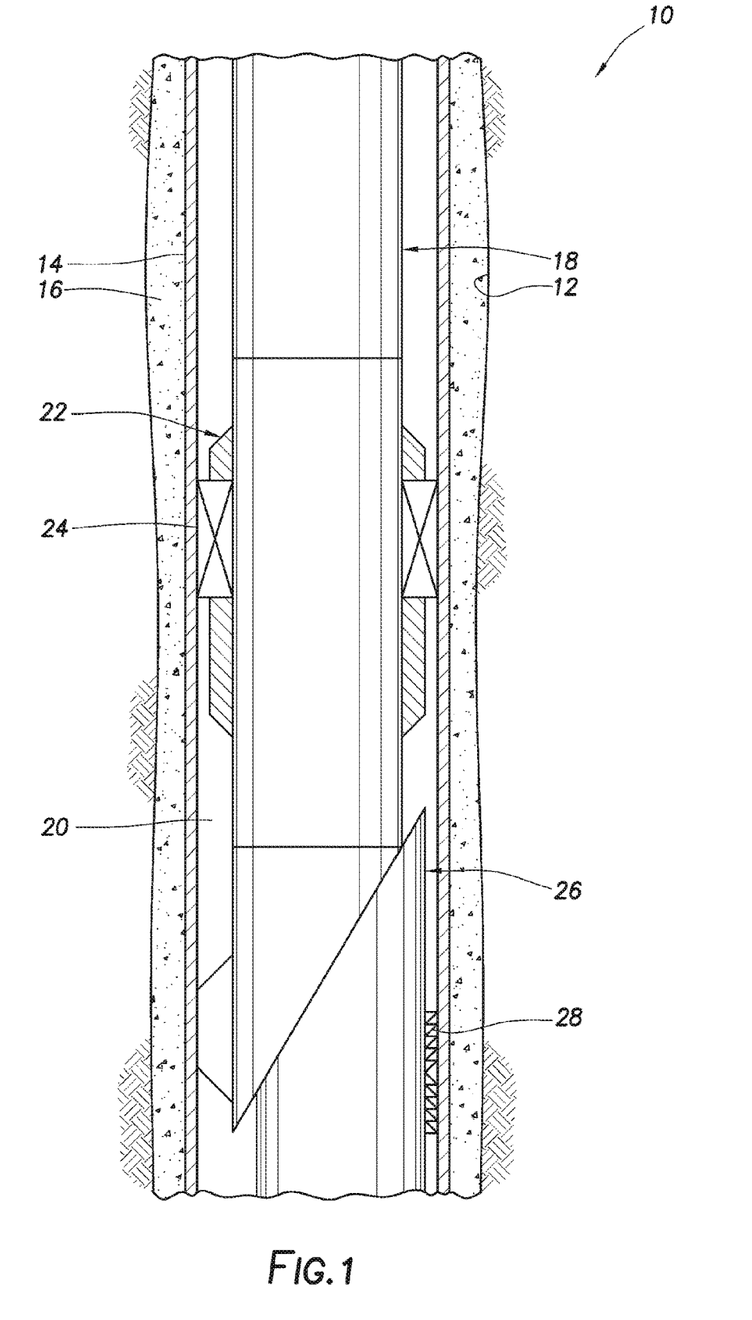
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a generally vertical wellbore 12 has been drilled into the earth, and the wellbore 12 has been lined with casing 14 and cement 16. In other examples, the wellbore 12 may not be vertical, or may not be lined with casing 14 or cement 16. If used, the casing 14 could be in the form of a liner, tubing, pipe or other tubular.

As depicted in FIG. 1, another tubular string 18 is positioned in the wellbore 12. The tubular string 18 could be a production tubing string, a liner string, a work string, a completion string, a sidetracking tool string (e.g., including a whipstock or other deflector), or any other type of tubular string.

To seal off an annulus 20 surrounding the tubular string 18, a packer assembly 22 is connected in the tubular string 18. The packer assembly 22 in this example includes a seal element assembly 24. The seal element assembly 24 serves to seal off the annulus 20 formed radially between the tubular string 18 and an interior well surface (such as, an interior surface of the casing 14, or an inner wall surface of the wellbore 12 if the wellbore is uncased).

The FIG. 1 tubular string 18 also includes a gripping assembly 26. The gripping assembly 26 may include one or more slips or other engagement or gripping elements 28 to secure the tubular string 18 in the wellbore 12.

In some examples, the gripping assembly 26 could be combined with the seal element assembly 24 in the packer assembly 22. In other examples, the gripping assembly 26 could be used without the packer assembly 22. Thus, the scope of this disclosure is not limited to any particular details of the packer assembly 22 as described herein or depicted in the drawings.

In the FIG. 1 example, the gripping assembly 26 is "set" by applying a compressive force in the tubular string 18 (e.g., by slacking off on the tubular string 18 at surface). This causes the gripping elements 28 to be biased radially outward into gripping engagement with an interior surface of the casing 14. If the wellbore 12 is uncased, the gripping elements 28 may grippingly engage an interior wall surface of the wellbore 12.

The gripping assembly 26 can include certain beneficial features, and may be manufactured using certain techniques, as described more fully below. However, it should be fully understood that these features and techniques can be incorporated into other gripping assemblies or other types of gripping apparatus, in keeping with the principles of this disclosure.

Figure 2:
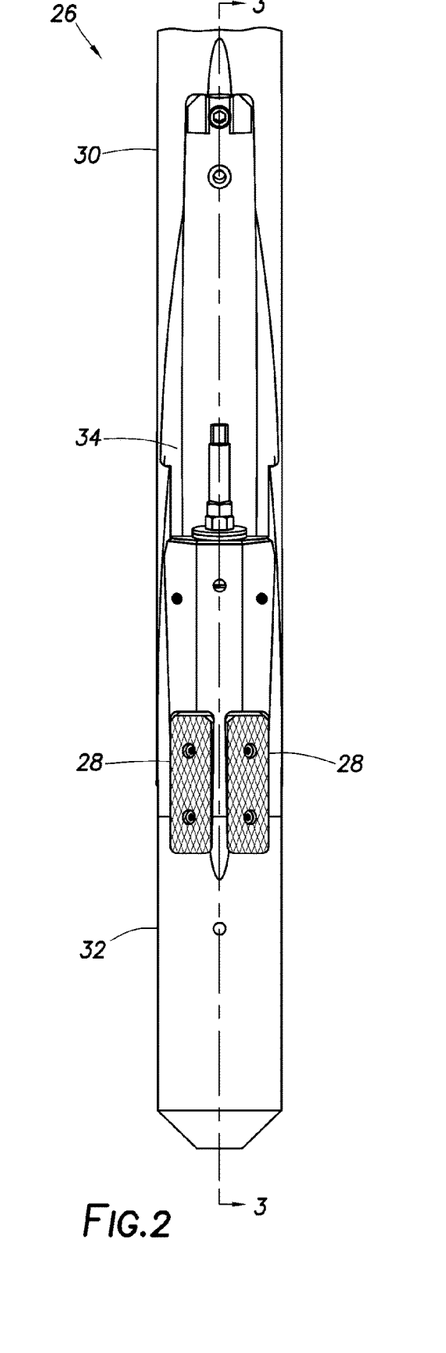
FIGS. 2 & 3 are representative partially elevational and cross-sectional views of an example of a gripping assembly that may be used in the system and method of FIG. 1.
Figure 3:
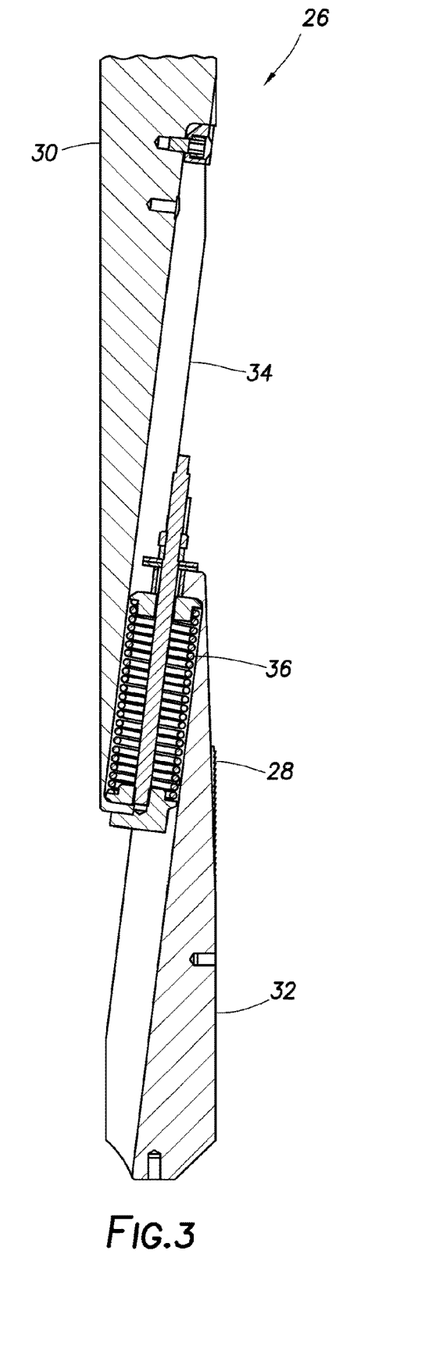

Referring additionally now to FIGS. 2 & 3, an example of a gripping assembly 26 that may be used in the FIG. 1 system 10 and method is representatively illustrated. The FIGS. 2 & 3 gripping assembly 26 may be used with other systems or methods, in keeping with the principles of this disclosure.

In the FIGS. 2 & 3 example, the gripping assembly 26 includes upper and lower body sections 30, 32. The upper and lower body sections 30, 32 are slidingly engaged along an inclined interface 34, so that relative longitudinal displacement between the body sections 30, 32 produces relative lateral displacement between the body sections 30, 32.

The gripping elements 28 are attached to the lower body section 32. A biasing device 36 biases the body sections 30, 32 toward a laterally expanded configuration, in which the gripping elements 28 are extended laterally or radially with the lower body section 32 relative to the upper body section 30.

In other examples, a gripping assembly may be actuated hydraulically, electrically or by other means. Gripping elements of a gripping assembly may extend outward in any direction or combination of directions. Thus, the scope of this disclosure is not limited to any particular details of the gripping assembly 26 or gripping elements 28 as described herein or depicted in the drawings.

Figure 4:
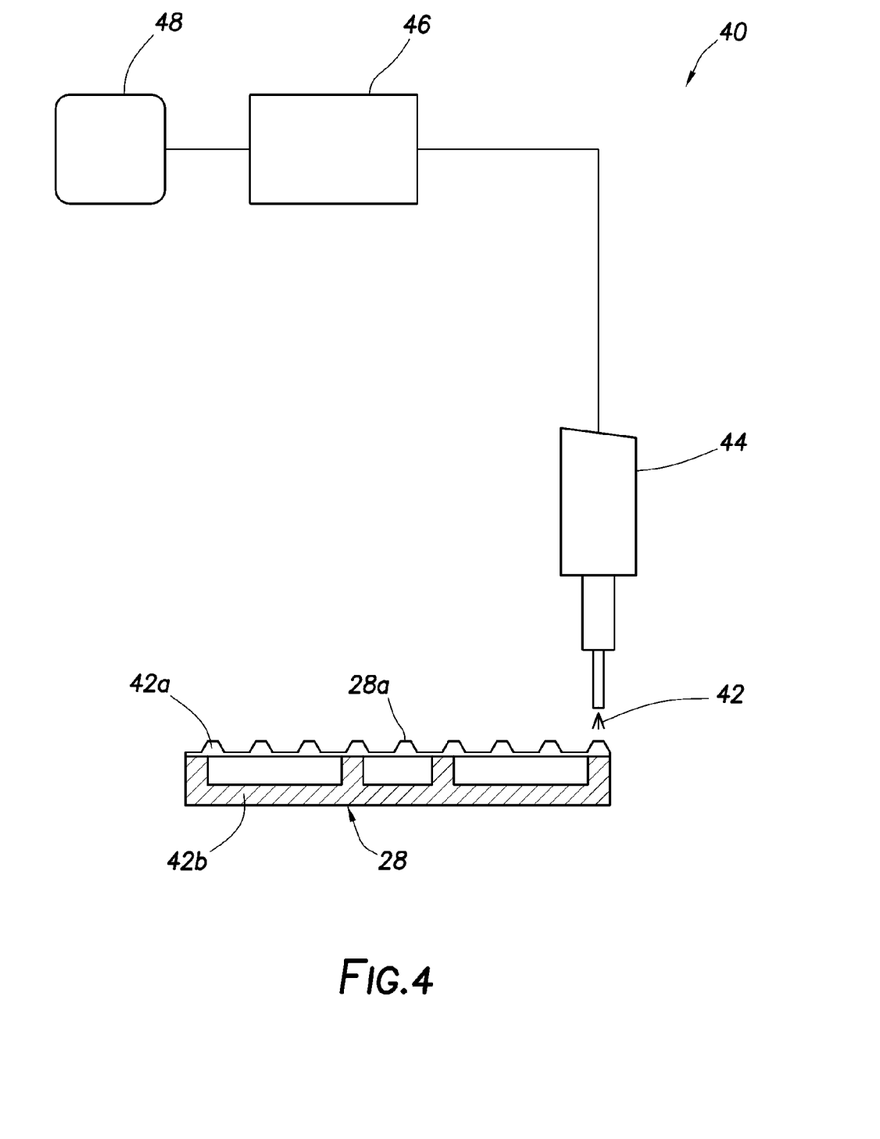
FIG. 4 is a representative partially cross-sectional view of an example of a gripping element being manufactured.

Referring additionally now to FIG. 4, an example method 40 of manufacturing a gripping element 28 is representatively illustrated. The gripping element 28 example depicted in FIG. 4 may be used in the gripping assembly 26 described herein, or the gripping element 28 may be used in other gripping apparatus.

In the FIG. 4 example, a gripping element material 42 is progressively deposited by an instrument 44 to thereby construct the gripping element 28. The material 42 may be deposited by, for example, spraying, ejecting, dispensing, pouring or otherwise placing the material 42 so that it becomes an integral part of the gripping element 28. In this example, each successive pass of deposited material 42 becomes bonded to or fused with at least one selected previously deposited pass of the material 42, so that the gripping element 28 is gradually built up as an integral combination of all of the passes of the material 42 deposited by the instrument 44.

The instrument 44 is controlled (e.g., spatial coordinates, motion characteristics, material 42 flow rate and type, etc.) by a control system 46. The control system 46 is provided with certain inputs 48 (such as, operator inputs, three-dimensional models, pre-programmed instructions, etc.).

The control system 46 can cause the instrument 44 to deposit the gripping element material 42 so that the resulting gripping element 28 is constructed with certain unique features that enhance the functionality of the gripping element 28. These features may include those that increase the gripping element's 28 gripping ability, fatigue resistance, conformance to a well surface, endurance and reliability.

In some examples, the gripping element material 42 deposited by the instrument 44 can be a metallic material. The gripping element material 42 may comprise one or more metals or metal alloys. As used herein, the terms "metal," "metallic" and similar terms refer to materials comprising, in whole or in part, at least one metal or metal alloy.

In harsh environments, the gripping element material 42 may advantageously comprise a metal or metallic material. Such materials generally possess superior properties as compared to other materials (such as elastomers or other polymers). However, it is not necessary for all or any portion of the gripping element 28 to comprise a metal or metallic material in keeping with the scope of this disclosure.

The gripping element 28 has a gripping surface 28a configured to grip another surface (such as, the interior surface of the casing 14, the interior wall surface of the wellbore 12 or another well surface). In the FIG. 4 example, the gripping surface 28a comprises teeth that bite into a well surface, in order to prevent relative displacement between the well surface and the gripping element 28 (and its associated gripping assembly 26).

Note that it is not necessary for a gripping surface to comprise teeth or any other structure that bites into a well surface, in keeping with the principles of this disclosure. Gripping structures other than teeth (such as, textures, ridges, interlocking profiles, etc.) may be used in some examples.

The control system 46 can cause the instrument 44 to vary selected properties of the gripping element material 42 while it is being deposited to construct the gripping element 28. In the FIG. 4 example, one gripping element material 42a may be deposited to form the gripping surface 28a of the gripping element 28, and another gripping element material 42b may be deposited to form a main resilient body of the gripping element 28.

Although the gripping element materials 42a,b are depicted in FIG. 4 as being separate, discrete components of the gripping element 28, there may instead be a gradual change from one material to another, such as, by gradually varying a ratio of the materials 42a,b, or by gradually varying a characteristic of the material 42 (for example, a density, size, quantity, shape, etc. of voids in the material 42). Thus, as used herein, the term "material" is used to indicate a substance with certain physical properties, and those physical properties may change from one location to another in the gripping element 28. The physical properties can be changed gradually using the method 40, so that there is no distinct boundary between the materials 42a,b.

In one example, the gripping element material 42a could have relatively high toughness, strength, hardness, durability, resistance to well fluids and/or temperature resistance as compared to the gripping element material 42b. In another example, the gripping element material 42a could comprise a relatively deformable metal, such as aluminum or magnesium, in order to enhance its capability to conform to a well surface and any irregularities. However, the scope of this disclosure is not limited to use of any particular material types or properties for the gripping element material 42a.

The gripping element material 42b could have relatively high resilience and compressibility as compared to the gripping element material 42a, as well as other adequate material properties to withstand its intended environment. In this example, the gripping element material 42b serves to outwardly bias the gripping element material 42a (so that the gripping element material 42a grippingly engages another surface), and can enable the gripping element material 42a to conform to a well surface it engages. The gripping element material 42b could comprise a metal (such as a metal foam), an elastomer or other polymer, a combination of different materials, etc. The scope of this disclosure is not limited to use of any particular material types or properties for the gripping element material 42b.

The gripping element materials 42a,b can in some examples comprise a same basic matrix material, but with at least one change that affects a material property. For example, one of the gripping element materials 42a,b could comprise a metal, and the other gripping element material could comprise the same metal, but with pores or voids that cause the resulting porous metal to be more compressible and less dense as compared to the non- or less-porous metal. In this example, the same instrument 44 can deposit both of the materials 42a,b, and change between the materials 42a,b by varying a size, number, location, etc. of pores or voids in the gripping element material 42.

In other examples, the gripping element materials 42a,b may comprise completely different materials. For example, one of the gripping element materials 42a,b could comprise a metal, and the other gripping element material could comprise an elastomer. The same instrument 44 may deposit the different gripping element materials 42a,b, or different instruments 44 may deposit the respective different gripping element materials 42a,b.

Figure 5:
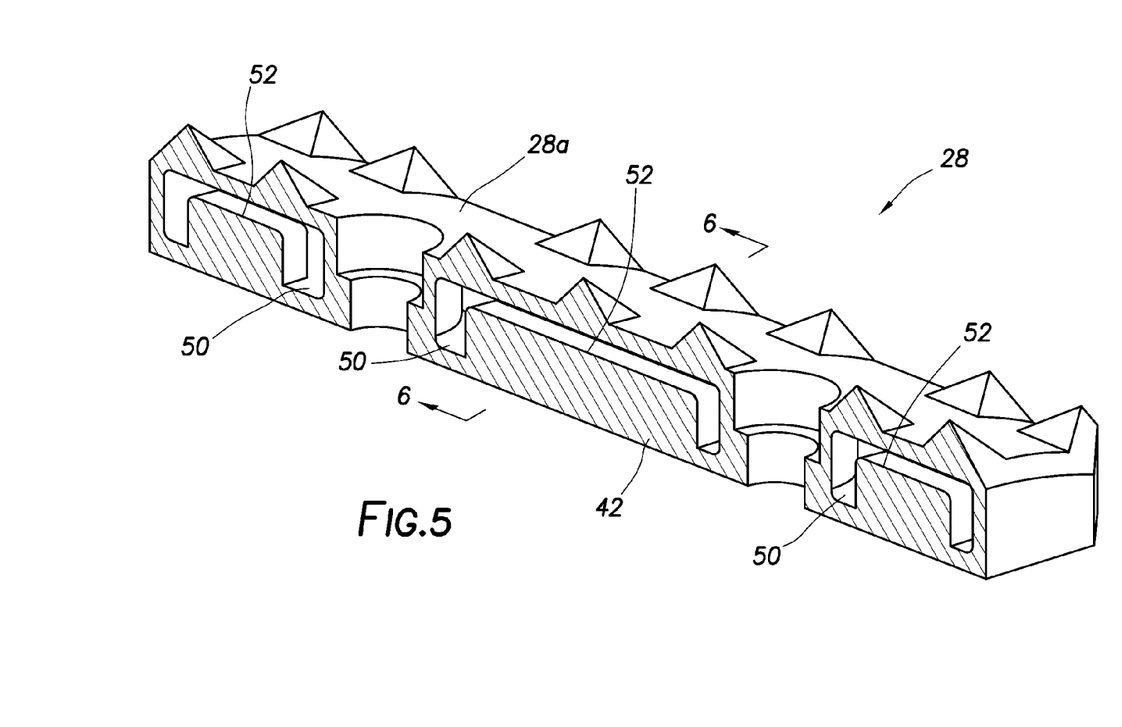
FIGS. 5 & 6 are representative cross-sectional views of another gripping element example.
Figure 6:
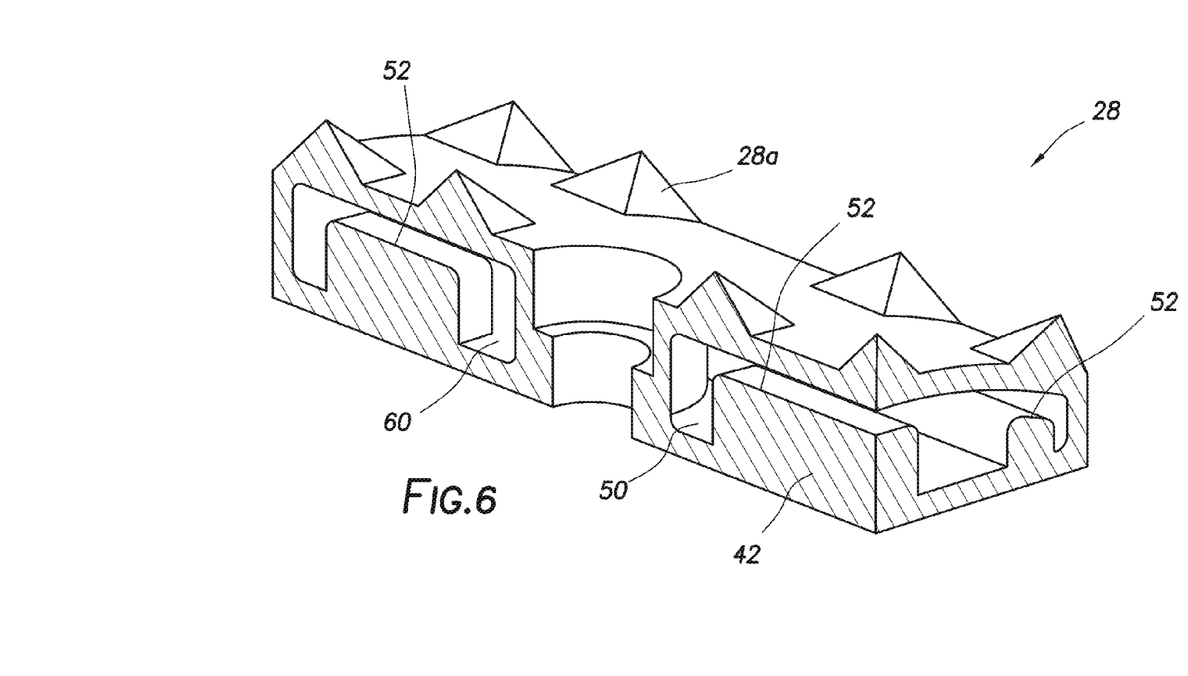

Referring additionally now to FIGS. 5 & 6, another example of the gripping element 28 is representatively illustrated in cross-sectional views (FIG. 6 being taken along line 6-6 of FIG. 5). The gripping element 28 of FIGS. 5 & 6 may be used in the gripping assembly 26 described herein, or in any other gripping apparatus.

In the FIGS. 5 & 6 example, the gripping element 28 includes internal abutments 52 that limit lateral or radial compression of the gripping element 28. The abutments 52 can be formed within the gripping element 28 by leaving appropriately shaped voids 50 in the gripping element material 42 as it is being deposited.

As depicted in FIGS. 5 & 6, the abutments 52 extend radially or laterally outward (within the gripping element 28), with the voids 50 being positioned between the abutments 52 and the gripping surface 28a. In other examples, the abutments 52 could extend radially or laterally inward, with the abutments being positioned between the voids 50 and the gripping surface 28a. The abutments 52 could be otherwise formed, configured or positioned in still further examples.

The abutments 52 allow the gripping element 28 to be radially or laterally compressed (for example, in order to conform to a well surface), but limits the compression to a selected amount. The selected amount may be varied by changing thicknesses and spacings of the material 42 and voids 50, and changing dimensions of the abutments 52.

Referring additionally now to FIGS. 7-12, cross-sectional views of additional examples of the gripping element 28 are representatively illustrated. These gripping element 28 examples may be used with the gripping assembly 26, or they may be used with other gripping apparatus.

Figure 7:
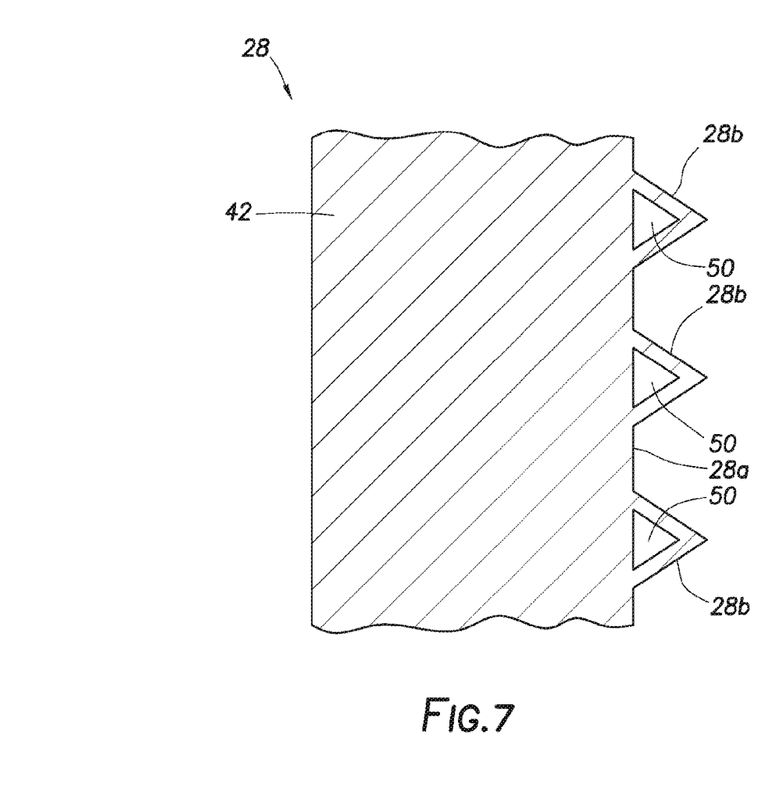
FIGS. 7-12 are representative cross-sectional views of various examples of gripping element materials and configurations.

In the FIG. 7 example, the gripping surface 28*a* has pyramidal teeth 28*b* formed thereon. The teeth 28*b* are appropriately configured to bite into or otherwise grip a well surface. Shapes other than pyramidal may be used in other examples. The teeth 28*b* may be made of the same material 42 as a main body of the gripping element 28, or the teeth 28*b* may be made of another material (such as, a harder, stronger or tougher material suitable for gripping a particular well surface).

In other examples, the teeth 28*b* may not be provided on the gripping surface 28*a*. The gripping element 28 may be configured to grip a well surface without the use of teeth 28*b* on the gripping surface 28*a*. For example, the gripping surface 28*a* could be provided with a texture or other structure that grips or otherwise increases friction between the gripping element 28 and the well surface, or that interlocks with the well surface.

As depicted in the FIG. 7 example, voids 50 are positioned at least partially within each of the teeth 28*b*. The voids 50 allow their respective teeth 28*b* to collapse or compress when a sufficient compressive force is applied to the teeth 28*b* (such as, when the gripping assembly 26 is set, and the gripping elements 28 are forced into gripping contact with a well surface). Since only the teeth 28*b* to which the sufficient compressive force has been applied will collapse or compress, this allows the gripping element 28 to conform to a shape of the well surface and any irregularities of the well surface.

Figure 8:
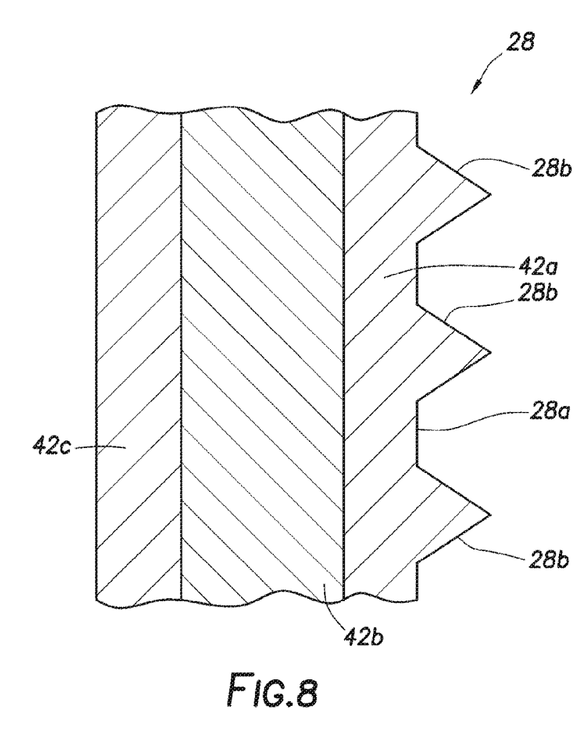

In the FIG. 8 example, the gripping element 28 is constructed with multiple different gripping element materials 42*a-c*. The material 42*a* may comprise a material suitable for use as the gripping surface 28*a* (such as, a relatively strong, tough or hard material). In this example, the material 42*a* may comprise a metal, a carbide, a crystalline structure (such as synthesized diamond), a relatively hard polymer, etc.

The material 42*b* may comprise a relatively compressible or resilient material suitable for allowing some deflection of the gripping surface 28*a* as it grippingly engages another surface (so that the gripping surface 28*a* conforms to the surface it engages). In this example, the material 42*b* may comprise a metal foam, porous metal or an elastomer.

The material 42*c* may comprise a material suitable for supporting the remainder of the gripping element 28. For example, the material 42*c* may form a base or "starting point" on which the other materials 42*a,b* are deposited (as in the method 40 of FIG. 4). As another example, the material 42*c* may be provided for mounting the gripping element 28 to the gripping assembly 26 (see FIGS. 2 & 3), or for displacing the gripping element 28 outward into engagement with a surface. In this example, the material 42*c* may comprise a suitably strong and rigid metal, polymer, etc. In some examples, the material 42*c* could be the same as the material 42*a*.

Figure 9:
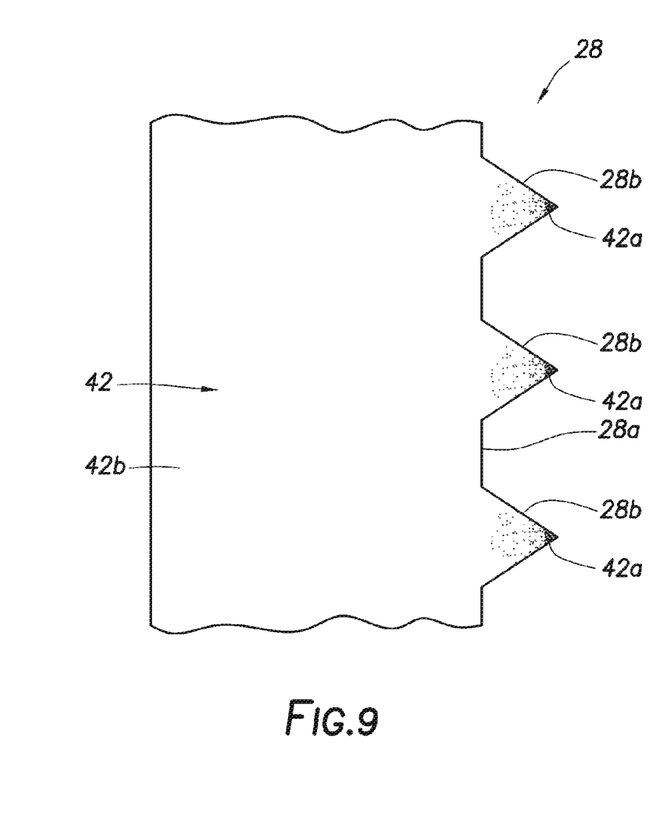

In the FIG. 9 example, the gripping surface 28*a* is made of a relatively strong, tough and hard material 42*a*, as in the FIG. 8 example. However, in the FIG. 9 example, properties of the gripping device material 42 gradually change between the material 42*a* and the material 42*b*. This result could be accomplished, for example, by first depositing one of the materials 42*a,b* from the instrument 44 in the method 40 of FIG. 4, and then gradually increasing a proportion of the other material deposited from the instrument 44.

A ratio of the materials 42*a,b* can be varied as the gripping element material 42 is deposited from the instrument 44 to form the gripping element 28. This varying of the ratio can be an increase, a decrease, any combination or pattern of increases and decreases, and can be performed continuously, intermittently, incrementally, periodically or otherwise in order to vary any selected material property or properties.

For example, a metallic proportion of the gripping element material 42 could be varied during the method 40, so that the material 42*a* comprises a significantly greater proportion of metal, as compared to the material 42*b*. In this manner, the material 42*a* could have increased abrasion resistance, strength, well fluids resistance, density, toughness or durability as compared to the material 42*b*, and the material 42*b* can have increased compressibility, increased resilience or decreased density as compared to the material 42*a*.

In any of the gripping elements 28 and gripping element materials 42 described herein, material properties can vary gradually, continuously, intermittently, incrementally, periodically or otherwise. For example, although at one location in a gripping element 28 a first material (e.g., material 42*a*) may predominate, and at another location in the gripping element 28 a second material (e.g., material 42*b*) may predominate, there can be various mixtures of the materials 42*a,b* at other locations.

Figure 10:
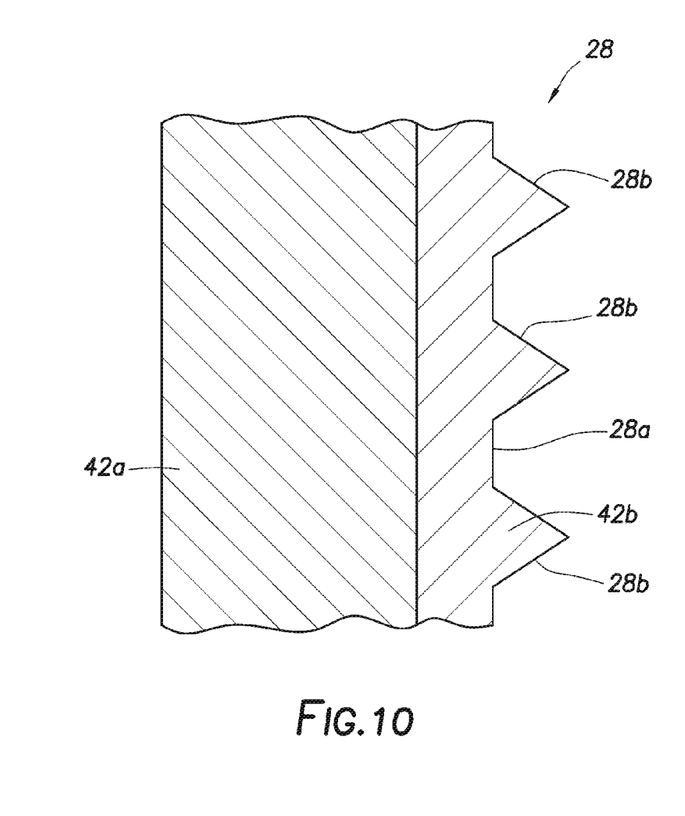

In the FIG. 10 example, the material 42*b* used to form the gripping surface 28*a* (and optional teeth 28*b*) comprises a softer, more deformable material as compared to the material 42*a* used to form a main body of the gripping element 28. For example, the material 42*b* may be more compressible, less strong or less dense as compared to the material 42*a*. This allows the gripping surface 28*a* to deform as the gripping element 28 grippingly engages a well surface, so that the gripping surface 28*a* conforms to a shape of the well surface, including any irregularities on the well surface.

In this example, the material 42*b* may comprise a metal foam, porous metal or an elastomer. Note that it is not necessary for the material 42*b* to be resilient, but resiliency could be advantageous in some situations.

In the FIG. 10 example, the material 42*a* may comprise a relatively strong, tough or hard material. The material 42*a* may comprise a metal or a polymer.

Figure 11:
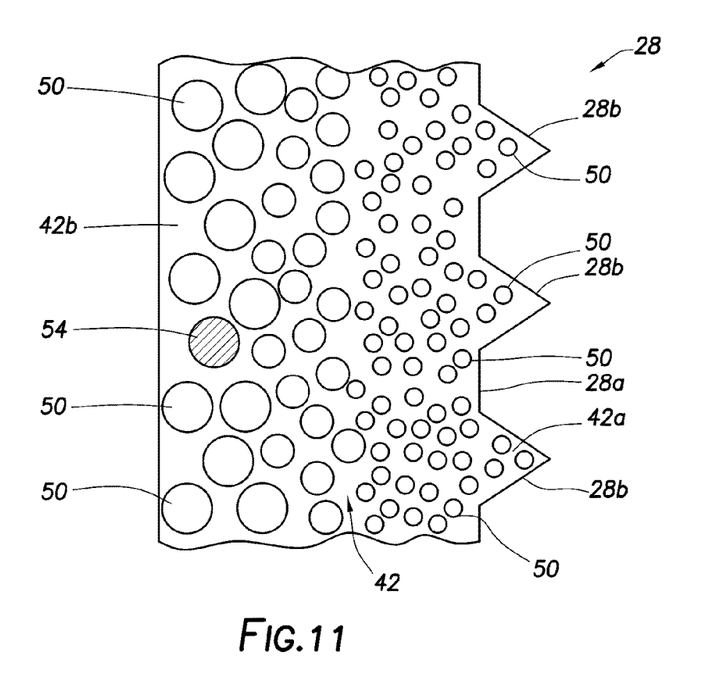

In the FIG. 11 example, material properties of the gripping element material 42 are varied by altering a number, size, location, shape or density (void volume/gross material 42 volume) of voids 50 in the gripping element material 42. The material 42*a* in this example comprises a greater number of the voids 50 per unit volume as compared to the material 42*b*, but the voids 50 in the material 42*a* are smaller in size and more densely packed as compared to the material 42*b*. The density, hardness and strength of the gripping element material 42 generally increases, and its compressibility generally decreases, with corresponding decreases in void 50 size or quantity per unit volume, and vice versa.

As depicted in FIG. 11, the material 42*b* is more compressible, due to increased void 50 size, as compared to the material 42*a*. Thus, the material 42*b* can compress as the gripping element 28 grippingly engages another surface, allowing the gripping surface 28*a* to deflect and conform to the surface.

Characteristics of the voids 50 (size, quantity, shape, density, etc.) can be varied as the gripping element material 42 is deposited from the instrument 44 to form the gripping element 28 in the method 40 of FIG. 4. This varying of the void 50 characteristics can be an increase, a decrease, any combination or pattern of increases and decreases, and can be performed gradually, continuously, intermittently, incrementally, periodically or otherwise in order to vary any selected material property or properties. Varying of void 50 characteristics may be used to change material properties (e.g., between materials 42a,b) in any of the gripping elements 28 or gripping element materials 42 described herein.

The gripping element material 42 may be "open-celled" in that the pores or voids 50 are substantially interconnected with each other, and with an exterior of the gripping element material 42. Thus, characteristics of the pores or voids 50 (such as quantity, size, density, shape, etc.) can be varied, in order to change a total surface area of the gripping element material 42 exposed to well fluids or other downhole elements.

If, for example, it is desired for the gripping element material 42 to eventually dissolve or otherwise degrade after exposure to well fluids, then the characteristics of the pores or voids 50 can be designed so that the dissolving or other degrading occurs upon passage of a selected period of time. As another example, heat transfer through the gripping element material 42 may be varied by changing the characteristics of the pores or voids 50.

The gripping element material 42 may be "closed-celled" in that the pores or voids 50 are substantially isolated from each other and the exterior of the gripping element material 42. In this case, the pores or voids 50 may be empty, or they may contain a fluid, gel, gas or other material.

Material 54 in the pores or voids 50 can be used to modify or enhance properties of the gripping element material 42. For example, a compressible material 54 (such as a gas at a selected pressure) could be contained in the pores or voids 50 to modify the compressibility of the gripping element material 42. As another example, a resilient material 54 (such as an elastomer) could be contained in the pores or voids 50 to increase the resilience of the gripping element material 42.

The material 54 in the pores or voids 50 could be gradually released from the pores or voids (for example, if the gripping element material 42 is open-celled). Alternatively, the material 54 in the pores or voids 50 could be released upon compression or other deformation of the gripping element material 42.

A material 54 in the pores or voids 50 could enhance properties (such as, strength, toughness, hardness, etc.) during heat treatment of the gripping element material 42. A solvent or swell-activating agent in the pores or voids 50 can cause the gripping element material 42 to dissolve or swell, respectively, after a selected period of time, or upon exposure to a particular environmental condition (such as elevated temperature). Thus, the scope of this disclosure is not limited to any particular purpose or result of disposing any material 54 in the pores or voids 50 of the gripping element material 42.

Figure 12:
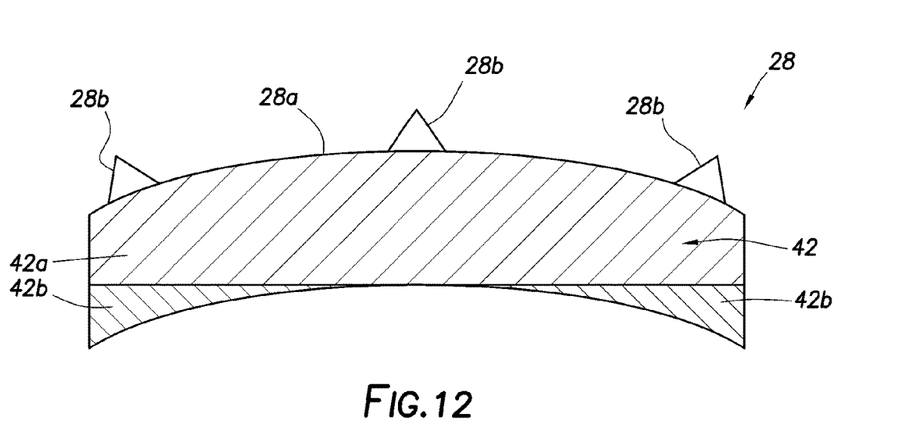

In FIG. 12, a lateral cross-sectional view is depicted for another example of the gripping element 28. In this example, certain portions of the main body of the gripping element 28 are constructed with the material 42b. The remainder of the gripping element 28 may comprise the material 42a.

In the FIG. 12 example, the material 42b is more compressible, and optionally more resilient and less dense, as compared to the material 42a. The material 42a may have greater strength, hardness, toughness or density, as compared to the material 42b.

In use, the material 42b can compress as the gripping element 28 grippingly engages another surface, allowing the gripping surface 28a to deflect and conform to the surface. In this example, the material 42b can compress and allow the gripping element 28 to rotate (in a clockwise or counter-clockwise direction as viewed in FIG. 12), so that the gripping surface 28a can more closely conform to the surface it engages.

In most of the examples described herein and depicted in the drawings, two gripping element materials 42a,b are used to demonstrate how properties of the gripping element material 42 can be varied in the gripping element 28. However, any number or combination of gripping element materials may be used in keeping with the scope of this disclosure.

Furthermore, a described property or characteristic of any of the gripping element materials 42a,b may be substituted or replaced by the property or characteristic of the other gripping element material. Positions of the gripping element materials 42a,b may be reversed or exchanged.

Any of the gripping elements 28 described herein may be manufactured using the method 40 or any "additive manufacturing" techniques known to those skilled in the art by which materials can be deposited so that they accumulate to form the finished gripping element 28. Such techniques allow materials, and their properties, structures and characteristics, to be varied as desired in the gripping element 28.

In any of the examples described herein, properties of the gripping element material 42 may be varied in the gripping element 28 to change between the gripping element materials 42a,b. There may be a gradual change from one material to another, such as, by gradually varying a ratio of the materials 42a,b, or by gradually varying a characteristic of the material 42 (for example, a density, size, quantity, shape, etc. of voids in the material 42). The physical properties can be changed gradually using the method 40, so that there is no distinct boundary between the materials 42a,b.

The gripping element materials 42a,b may comprise the same basic matrix material, but the gripping element materials 42a,b can have different properties due to, for example, the presence of voids 50 therein. In one example, the gripping element material 42a could comprise a solid (i.e., no voids therein) steel, aluminum or other metal, and the gripping element material 42b could comprise the same metal, but with voids 50 therein that reduce the density and increase the compressibility of the gripping element material 42b as compared to the gripping element material 42a. The size, number, density, shape or other characteristic of the voids 50 could gradually change from the material 42a to the material 42b, so that there is no distinct boundary between the materials 42a,b.

Although in examples described above and depicted in the drawings, teeth 28b are provided on the gripping surface 28a, the gripping element 28 may be configured to grip a well surface without the use of teeth 28b. For example, the gripping surface 28a could be provided with a texture or other structure that grips or otherwise increases friction between the gripping element 28 and the well surface, or that interlocks with the well surface. Thus, the scope of this disclosure is not limited to use of teeth 28b on the gripping surface 28a.

It may now be fully appreciated that the above disclosure provides significant advancements to the arts of designing and manufacturing gripping apparatus. In some examples described above, the gripping element material 42 is deposited to form the gripping element 28, with properties and characteristics of the gripping element material 42 varying in the gripping element 28.

The above disclosure provides to the art a method 40 of manufacturing a gripping element 28. In one example, the method 40 comprises depositing a gripping element material 42, and thereby gradually building up the gripping element 28 and forming a gripping surface 28a thereon, the gripping surface 28a being configured to grippingly engage a well surface (such as, an interior surface of the casing 14, or an interior wall of the wellbore 12 if the wellbore is uncased).

The depositing step can include enclosing with the gripping element material 42 one or more voids 50 in the gripping element 28. The depositing step may include varying a property of the gripping element material 42 in the gripping element 28, the property variation corresponding to a change in a characteristic of the voids 50. The void characteristic can comprise a size, shape, density and/or quantity of the voids 50. The void characteristic at the gripping surface 28a of the gripping element 28 may be different from the void characteristic at a location in the gripping element 28 spaced apart from the gripping surface 28a (such as, a main body of the gripping element 28).

The depositing step can include positioning the voids 50 underlying the gripping surface 28a. The positioning step can include positioning the voids 50 at least partially within teeth 28b or other gripping structures on the gripping surface 28a.

The method 40 can include containing a resilient or compressible material (such as an elastomer or compressible liquid or gel, etc.) in the voids 50. The method 40 can include containing a pressurized fluid (such as a liquid or gas) in the voids 50.

The depositing step can include forming one or more abutments 52 in the gripping element 28. The abutments 52 may limit compression of the gripping element 28.

The gripping element material 42 can comprise at least first and second gripping element materials 42a,b. The depositing step may include depositing both of the first and second gripping element materials 42a,b.

The depositing step can include positioning the first gripping element material 42a at the gripping surface 28a. The first gripping element material 42a may have a property different from the second gripping element material 42b. The property may comprise at least one of strength, hardness, toughness, density, compressibility, resilience, permeability, porosity and/or fatigue resistance. The depositing step may include gradually varying the property from the first gripping element material 42a to the second gripping element material 42b in the gripping element 28.

The method may include the first and/or second gripping element material(s) 42a,b compressing as the gripping surface 28a engages the well surface 12, 14. The method may include the gripping element 28 conforming to the well surface 12, 14 in response to compression of the first and/or second gripping element material(s) 42a,b. The compression may comprise compression of voids 50 in the first and/or second gripping element material(s) 42a,b.

A compressible material (such as a resilient material 54) or a pressurized fluid may be contained in voids 50 in the first and/or second gripping element material(s) 42a,b.

A gripping system 10 is also provided to the art by the above disclosure. In one example, the system 10 may include at least one extendable gripping element 28 configured to grip a well surface 12, 14, and the gripping element 28 comprising a gripping element material 42 enclosing one or more voids 50 in the gripping element 28.

The gripping element material 42 may comprise a material deposited about the voids 50. A property of the gripping element material 42 may vary in the gripping element 28, the property variation corresponding to a change in a characteristic of the voids 50. The void characteristic may comprise a size, shape, density and/or quantity of the voids 50. The void characteristic at a gripping surface 28a of the gripping element 28 may be different from the void characteristic at a location in the gripping element 28 spaced apart from the gripping surface 28a (such as, in a main body of the gripping element 28).

The gripping element 28 may include one or more abutments 52 in the gripping element 28. The abutments 52 may limit compression of the gripping element 28.

The voids 50 may be positioned underlying a gripping surface 28a of the gripping element 28. The voids 50 may be positioned at least partially within teeth 28b or other gripping structures on the gripping surface 28a.

A compressible material (such as a resilient material 54) may be contained in the voids 50. A pressurized fluid may be contained in the voids 50.

The gripping element material 42 may comprise at least two different gripping element materials 42a,b, and at least one of the first and second gripping element materials 42a,b may be deposited about the voids 50.

Another gripping system 10 is provided to the art by this disclosure. In one example, the system 10 can include at least one extendable gripping element 28 configured to grip a well surface 12, 14, and the gripping element 28 comprising at least first and second gripping element materials 42a,b deposited to form the gripping element 28 having a gripping surface 28a.

The first gripping element material 42a may be positioned at the gripping surface 28a, and the first gripping element material 42a may have a property different from the second gripping element material 42b. The property may be strength, hardness, toughness, density, compressibility, resilience, permeability, porosity and/or fatigue resistance. The property may vary gradually from the first gripping element material 42a to the second gripping element material 42b in the gripping element 28.

The first and/or second gripping element material(s) 42a,b may compress as the gripping surface 28a engages the well surface 12, 14. The gripping element 28 may conform to the well surface 12, 14 in response to compression of the first and/or second gripping element material(s) 42a,b. The compression of the first and/or second gripping element material(s) 42a,b may comprise compression of voids 50 in the first and/or second gripping element material(s) 42a, b.

A compressible material (such as a resilient material 54) or a pressurized fluid may be contained in voids 50 in the first and/or second gripping element material(s) 42a,b.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used.

Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of manufacturing a gripping element, the method comprising:
    depositing a gripping element material, and thereby gradually building up the gripping element and forming a gripping surface thereon, the gripping surface being configured to grippingly engage a well surface,
    in which the depositing further comprises forming one or more abutments in the gripping element, and
    in which the abutments limit compression of the gripping element.

2. The method of claim 1, in which the depositing comprises enclosing with the gripping element material one or more voids in the gripping element.

3. The method of claim 2, in which the depositing further comprises varying a property of the gripping element material in the gripping element, the property variation corresponding to a change in a characteristic of the voids.

4. The method of claim 2, in which the depositing further comprises positioning the voids underlying the gripping surface.

5. The method of claim 2, further comprising containing a compressible material in the voids.

6. The method of claim 2, further comprising containing a pressurized fluid in the voids.

7. The method of claim 1, in which the gripping element material comprises at least first and second gripping element materials, and the depositing further comprises depositing both of the first and second gripping element materials.

8. The method of claim 7, in which the depositing further comprises positioning the first gripping element material at the gripping surface, and in which the first gripping element material has a property different from the second gripping element material.

9. The method of claim 7, in which the depositing further comprises configuring at least one of the first and second gripping element materials to compress as the gripping surface engages the well surface.

10. The method of claim 7, in which the depositing further comprises configuring the gripping element to conform to the well surface in response to compression of at least one of the first and second gripping element materials.

11. The method of claim 7, in which a compressible material is contained in voids in at least one of the first and second gripping element materials.

12. The method of claim 7, in which a pressurized fluid is contained in voids in at least one of the first and second gripping element materials.

13. A gripping system, comprising:
    at least one extendable gripping element configured to grip a well surface,
    the gripping element comprising a gripping element material enclosing one or more voids in the gripping element, and
    in which the gripping element further comprises one or more abutments in the gripping element, and in which the abutments limit compression of the gripping element.

14. The gripping system of claim 13, in which the gripping element material comprises a material deposited about the voids.

15. The gripping system of claim 13, in which a property of the gripping element material varies in the gripping element, the property variation corresponding to a change in a characteristic of the voids.

16. The gripping system of claim 13, in which the voids are positioned underlying a gripping surface of the gripping element.

17. The gripping system of claim 13, in which a compressible material is contained in the voids.

18. The gripping system of claim 13, in which a pressurized fluid is contained in the voids.

19. The gripping system of claim 13, in which the gripping element material comprises at least first and second different gripping element materials, and in which at least one of the first and second gripping element materials is deposited about the voids.

20. A gripping system, comprising:
    at least one extendable gripping element configured to grip a well surface,
    the gripping element comprising at least first and second gripping element materials deposited to form the gripping element having a gripping surface, and
    in which at least one of the first and second gripping element materials is configured to compress when the gripping surface engages the well surface.

21. The gripping system of claim 20, in which the first gripping element material is positioned at the gripping surface, and the first gripping element material has a property different from the second gripping element material.

22. The gripping system of claim 20, in which the gripping element conforms to the well surface in response to compression of at least one of the first and second gripping element materials.

23. The gripping system of claim 20, in which a compressible material is contained in voids in at least one of the first and second gripping element materials.

24. The gripping system of claim 20, in which a pressurized fluid is contained in voids in at least one of the first and second gripping element materials.

* * * * *